United States Patent
Kim et al.

(10) Patent No.: US 12,107,276 B2
(45) Date of Patent: Oct. 1, 2024

(54) POSITIVE ELECTRODE FOR LITHIUM-SULFUR SECONDARY BATTERY HAVING PATTERN, MANUFACTURING METHOD THEREFOR, AND LITHIUM-SULFUR SECONDARY BATTERY INCLUDING SAME

(71) Applicant: LG ENERGY SOLUTION, LTD., Seoul (KR)

(72) Inventors: Bong Soo Kim, Daejeon (KR); Gi Su Park, Daejeon (KR); Seong Ho Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 17/612,026

(22) PCT Filed: Sep. 16, 2020

(86) PCT No.: PCT/KR2020/012470
§ 371 (c)(1),
(2) Date: Nov. 17, 2021

(87) PCT Pub. No.: WO2021/060762
PCT Pub. Date: Apr. 1, 2021

(65) Prior Publication Data
US 2022/0223879 A1     Jul. 14, 2022

(30) Foreign Application Priority Data
Sep. 24, 2019 (KR) .......... 10-2019-0117573
Sep. 24, 2019 (KR) .......... 10-2019-0117755

(51) Int. Cl.
*H01M 4/80*     (2006.01)
*H01M 4/04*     (2006.01)
(Continued)

(52) U.S. Cl.
CPC .......... *H01M 4/80* (2013.01); *H01M 4/0404* (2013.01); *H01M 4/0435* (2013.01);
(Continued)

(58) Field of Classification Search
CPC .... H01M 4/80; H01M 4/0404; H01M 4/0435; H01M 4/133; H01M 4/1393;
(Continued)

(56) References Cited

U.S. PATENT DOCUMENTS 9,911,975 B2 *   3/2018   Kim ............... H01M 4/136
2013/0236782 A1   9/2013   Ozaki et al.
(Continued)

FOREIGN PATENT DOCUMENTS

CN    106784611 A    5/2017
CN    108963181 A    12/2018
(Continued)

OTHER PUBLICATIONS

International Search Report (PCT/ISA/210) issued in PCT/KR2020/012470 mailed on Dec. 21, 2020.
(Continued)

*Primary Examiner* — James M Erwin
(74) *Attorney, Agent, or Firm* — Birch, Stewart, Kolasch & Birch, LLP (57) ABSTRACT

A positive electrode for a lithium-sulfur secondary battery includes a positive electrode active material layer having an intaglio pattern formed therein. A method for manufacturing the same, and a lithium-sulfur secondary battery including the same are also provided. The positive electrode active material layer has a porosity of 50 to 65%. The intaglio pattern has a width of 1 to 100 μm and a depth of 30 to 99% based on the thickness of the positive electrode active material layer. The volumetric ratio of the positive electrode active material layer and the intaglio pattern is 4:1 to 40:1.
(Continued)

When the positive electrode is applied to a lithium-sulfur secondary battery, the energy density per unit volume can be remarkably improved.

14 Claims, 7 Drawing Sheets

(51) Int. Cl.
*H01M 4/133* (2010.01)
*H01M 4/1393* (2010.01)
*H01M 4/36* (2006.01)
*H01M 10/052* (2010.01)
*H01M 4/02* (2006.01)

(52) U.S. Cl.
CPC ......... *H01M 4/133* (2013.01); *H01M 4/1393* (2013.01); *H01M 4/364* (2013.01); *H01M 10/052* (2013.01); *H01M 2004/021* (2013.01); *H01M 2004/028* (2013.01)

(58) Field of Classification Search
CPC ............... H01M 4/364; H01M 10/052; H01M 2004/021; H01M 2004/028
USPC ......................................................... 429/209
See application file for complete search history.

(56) References Cited

U.S. PATENT DOCUMENTS

| | | | | |
|---|---|---|---|---|
| 2014/0023924 | A1* | 1/2014 | Kolosnitsyn | H01M 10/0525 429/211 |
| 2014/0342227 | A1 | 11/2014 | Hasenkox et al. | |
| 2016/0218352 | A1* | 7/2016 | Musameh | H01M 10/0569 |
| 2017/0263933 | A1 | 9/2017 | Akikusa et al. | |
| 2017/0331150 | A1* | 11/2017 | Park | H01M 4/625 |
| 2018/0337391 | A1* | 11/2018 | Yu | H01M 4/139 |
| 2019/0123377 | A1 | 4/2019 | Yang et al. | |
| 2020/0136127 | A1 | 4/2020 | Cho et al. | |

FOREIGN PATENT DOCUMENTS

| | | |
|---|---|---|
| CN | 109346770 A | 2/2019 |
| CN | 109473743 A | 3/2019 |
| JP | 2005-262324 A | 9/2005 |
| JP | 2008-277242 A | 11/2008 |
| JP | 2013-97825 A | 5/2013 |
| JP | 2018-58374 A | 4/2016 |
| KR | 10-2013-0103361 A | 9/2013 |
| KR | 10-1366023 B1 | 2/2014 |
| KR | 10-2014-0110860 A | 9/2014 |
| KR | 10-2015-0082958 A | 7/2015 |
| KR | 10-1550974 B1 | 9/2015 |
| KR | 10-1598583 B1 | 3/2016 |
| KR | 10-2016-0053886 A | 5/2016 |
| KR | 10-2016-0056553 A | 5/2016 |
| KR | 10-1669316 B1 | 10/2016 |
| KR | 10-2017-0023595 A | 3/2017 |
| KR | 10-2017-0094983 A | 8/2017 |
| KR | 10-1876402 B1 | 7/2018 |
| KR | 10-2018-0102406 A | 9/2018 |
| KR | 10-2019-0062969 A | 6/2019 |
| WO | WO 2019/009560 A1 | 1/2019 |

OTHER PUBLICATIONS

European Search Report for European Application No. 20870014.6, dated May 20, 2022.

* cited by examiner

POSITIVE ELECTRODE FOR LITHIUM-SULFUR SECONDARY BATTERY HAVING PATTERN, MANUFACTURING METHOD THEREFOR, AND LITHIUM-SULFUR SECONDARY BATTERY INCLUDING SAME

TECHNICAL FIELD

The present invention relates to a positive electrode for a lithium-sulfur secondary battery, a method for manufacturing the same, and a lithium-sulfur secondary battery comprising the same.

The present application claims the benefits of priorities based on Korean Patent Application Nos. 10-2019-0117573 and 10-2019-0117755 filed on Sep. 24, 2019, all the contents of which are incorporated herein by reference.

BACKGROUND ART

As the application area of secondary battery is expanding to the electric vehicles (EV) and the energy storage systems (ESS), the lithium-ion secondary battery with relatively low weight-to-energy storage density (~250 Wh/kg) is facing limitations in application to such products. Alternatively, since the lithium-sulfur secondary battery can achieve the theoretically high weight-to-energy storage density (~2,600 Wh/kg), it is attracting attention as a next-generation secondary battery technology.

The lithium-sulfur secondary battery means a battery system using a sulfur-based material having an S—S bond (sulfur-sulfur bond) as a positive electrode active material and using lithium metal as a negative electrode active material. Sulfur, which is the main material of the positive electrode active material, has advantages that it is very rich in resources, is not toxic, and has a low atomic weight.

In the lithium-sulfur secondary battery, when discharging the battery, lithium which is a negative electrode active material is oxidized while releasing electron and thus ionizing, and the sulfur-based material which is a positive electrode active material is reduced while accepting the electron. In that case, the oxidation reaction of lithium is a process by which lithium metal releases electron and is converted to lithium cation form. In addition, the reduction reaction of sulfur is a process by which the S—S bond accepts two electrons and is converted to a sulfur anion form. The lithium cation produced by the oxidation reaction of lithium is transferred to the positive electrode through the electrolyte and is combined with the sulfur anion generated by the reduction reaction of sulfur to form a salt. Specifically, sulfur before discharging has a cyclic $S_8$ structure, which is converted to lithium polysulfide ($LiS_x$) by the reduction reaction. When the lithium polysulfide is completely reduced, lithium sulfide ($Li_2S$) is produced.

In a lithium-sulfur secondary battery, polysulfide is dissolved and adsorbed repeatedly during charging/discharging, so the movement of polysulfide with a higher molecular weight as well as lithium ions in the electrolyte solution has an important effect on the performance of the lithium-sulfur secondary battery. In addition, the electrolyte solution in which a large amount of polysulfide is dissolved has a high viscosity and slows the diffusion rate of lithium ions. Since the performance of the battery varies greatly depending on the material movement characteristics, a positive electrode containing a large amount of internal pores was also introduced by using a porous carbon material in the relevant technical field to improve the material movement characteristics.

However, if the porosity of the positive electrode is increased, the energy density may be increased, but the volume of the positive electrode is increased due to the volume occupied by the pores, resulting in a problem that the energy density per unit volume is decreased. In order to miniaturize the battery, a method for improving the energy density per unit volume is required in the relevant technical field.

Meanwhile, in the case of a lithium secondary battery that uses lithium-based oxides such as $LiCoO_2$, $LiMn_2O_4$, $LiNiO_2$, $LiMnO_2$ as a positive electrode active material, since there is no movement of materials with a large molecular weight such as polysulfide, porosity in the electrode does not significantly affect the battery performance. Therefore, in the lithium secondary battery, the positive electrode has much lower porosity than that of the lithium-sulfur secondary battery, and the positive electrode having such a low porosity has a problem in the wettability with the electrolyte solution at the surface. Korea Laid-open Patent Publication No. 10-2015-0082958 solves this problem by patterning the positive electrode with a laser and thus increasing the specific surface area of the positive electrode in order to improve the problem in the wettability with the electrolyte solution on the surface of the positive electrode. In contrast, since the lithium-sulfur secondary battery contains many pores in the positive electrode and thus the electrolyte solution is easily penetrated and the wettability between the electrolyte solution and the positive electrode is not a problem. Therefore, in the lithium-sulfur secondary battery, typically there was no need to use the laser patterning technique described above.

The inventors of the present invention have realized that the performance of the battery can be improved by modifying the shape of the positive electrode active material layer (the shape of the pores) by using laser patterning technology on the positive electrode of a lithium-sulfur secondary battery with low porosity, thereby processing the surface in a certain pattern, in order to improve the energy density per unit volume of a lithium-sulfur secondary battery, not to improve the wettability between the electrolyte solution and the positive electrode in the lithium-sulfur secondary battery, and have completed the present invention.

PRIOR ART DOCUMENT

Patent Document (Patent Document 1) Korea Laid-open Patent Publication No. 10-2015-0082958

DISCLOSURE

Technical Problem

The present invention is intended to provide a positive electrode for a lithium-sulfur secondary battery capable of improving the energy density per unit volume of the battery by changing the shape (pore shape) of the positive electrode active material layer to improve material movement characteristics within the positive electrode active material layer.

Technical Solution

According to a first aspect of the invention, the present invention provides a positive electrode for a lithium-sulfur secondary battery comprising a positive electrode active material layer in which an intaglio pattern is formed, wherein the positive electrode active material layer has a porosity of 50 to 65%.

In one embodiment of the present invention, the intaglio pattern has a width of 1 μm to 100 μmm.

In one embodiment of the present invention, the intaglio pattern has a depth of 30 to 99% based on a thickness of the positive electrode active material layer.

In one embodiment of the present invention, a volumetric ratio of the positive electrode active material layer and the intaglio pattern is 4:1 to 40:1.

In one embodiment of the present invention, the intaglio pattern has a shape of a plurality of straight lines or dashed lines that are horizontal or perpendicular to each other.

In one embodiment of the present invention, the intaglio pattern has a shape of a plurality of dots formed to be spaced apart from each other.

In one embodiment of the present invention, the intaglio pattern is located within 200 μm based on a predetermined point located on the surface of the positive electrode active material layer.

In one embodiment of the present invention, the positive electrode active material layer includes 60 to 95 parts by weight of a positive electrode active material based on 100 parts by weight of the positive electrode active material layer.

In one embodiment of the present invention, the positive electrode active material comprises a sulfur-carbon composite, and the sulfur-carbon composite contains 60 to 90 parts by weight of sulfur based on 100 parts by weight of the sulfur-carbon composite.

According to a second aspect of the present invention, the present invention provides a method of manufacturing the positive electrode for the lithium-sulfur secondary battery described above, comprising the steps of (1) forming a positive electrode active material layer by applying a slurry for forming a positive electrode active material on the current collector; (2) rolling by rolling the positive electrode active material layer; and (3) forming a positive electrode active material layer with an intaglio pattern formed by irradiating a laser on the surface of the positive electrode active material layer after rolling, wherein the positive electrode active material layer after rolling has a porosity of 50 to 65%.

According to a third aspect of the present invention, the present invention provides a lithium-sulfur secondary battery including the positive electrode described above.

Advantageous Effects

The positive electrode for the lithium-sulfur secondary battery according to the present invention can significantly improve energy density per unit volume, when applied to a battery, by rolling the positive electrode active material layer to form a positive electrode active material layer having uniform pores with a small content, and then patterning the surface of the positive electrode active material layer.

In addition, the positive electrode for the lithium-sulfur secondary battery according to the present invention can maintain a discharge capacity equal to that of the battery comprising a positive electrode active material having high porosity, when applied to a battery, even though the amount of the positive electrode active material was reduced by patterning.

BEST MODE

The embodiments provided according to the present invention can all be achieved by the following description. The following description should be understood as describing preferred embodiments of the present invention, and it should be understood that the present invention is not necessarily limited thereto.

For the physical properties described herein, if the measurement conditions and methods are not specifically described, the physical properties are measured according to the measurement conditions and methods generally used by those skilled in the art.

Positive Electrode Active Material Layer with Pattern

The present invention provides a positive electrode active material layer, in which an intaglio pattern is formed, as a configuration of a positive electrode for a lithium-sulfur secondary battery. The intaglio pattern refers to a pattern in which the portion where the pattern is formed is located lower than the peripheral portion. In the present invention, the intaglio pattern is formed in the positive electrode active material layer by irradiating a laser to the positive electrode active material layer to lose a part of the positive electrode active material layer.

The positive electrode active material layer is a coating layer comprising a positive electrode active material formed on a positive electrode current collector. The positive electrode active material layer includes an electrically conductive material and a binder together with a positive electrode active material.

The positive electrode active material may be selected from elemental sulfur ($S_8$), a sulfur-carbon composite, a sulfur-based compound, or a mixture thereof, but is not necessarily limited thereto. Specifically, the sulfur-based compound may be $Li_2S_n$ (n≥1), an organic sulfur compound, or a carbon-sulfur composite (($C_2S_x)_n$: x=2.5 to 50, n≥2). These sulfur materials are used in combination with an electrically conductive material because they do not have electrical conductivity alone. In addition, the sulfur-carbon composite may be an aspect of a positive electrode active material formed by mixing carbon and elemental sulfur or a sulfur-based compound to reduce the leakage of sulfur into the electrolyte and increase the electrical conductivity of an electrode containing sulfur. The ratio of the positive electrode active material in the positive electrode active material layer may be adjusted in consideration of the performance of a target battery. According to one embodiment of the present invention, the positive electrode active material layer contains 60 to 95 parts by weight of the positive electrode active material based on 100 parts by weight of the positive electrode active material layer.

The carbon material constituting the sulfur-carbon composite may be crystalline or amorphous carbon, and may be conductive carbon. Specifically, the carbon material may be selected from the group consisting of graphite, graphene, Super P, carbon black, Denka black, acetylene black, Ketjen black, channel black, furnace black, lamp black, thermal black, carbon fiber, carbon nanofiber, carbon nanotube, carbon nanowire, carbon nanoring, carbon fabric, and fullerene ($C_{60}$).

An exemplary sulfur-carbon composite is a sulfur-carbon nanotube composite and the like. Specifically, the sulfur-carbon nanotube composite contains sulfur or a sulfur compound in a carbon nanotube aggregate having a three-dimensional structure and in at least a portion of an inner surface and an outer surface of the carbon nanotube aggregate. Since the sulfur-carbon nanotube composite according to one embodiment of the present invention contains sulfur existing inside the three-dimensional structure of the carbon nanotube, if the soluble polysulfide can be located inside the carbon nanotube even if the soluble polysulfide is generated by the electrochemical reaction, the collapse of structure of the positive electrode can be suppressed by keeping the entangled structure in three dimensions even when leaching the polysulfide. As a result, the lithium-sulfur secondary battery comprising the sulfur-carbon nanotube composite has an advantage that a high capacity can be implemented even at a high loading. Also, sulfur or the sulfur-based compound may be contained in the inner pores of the carbon nanotube aggregate. The carbon nanotube refers to a linear electrically conductive carbon and specifically, the carbon nanotube may be carbon nanotube (CNT), graphitic nanofiber (GNF), carbon nanofiber (CNF), or activated carbon fiber (ACF). Both single-wall carbon nanotubes (SWCNT) and multi-wall carbon nanotubes (MWCNT) can be used.

According to one embodiment of the present invention, the sulfur-carbon composite is prepared by impregnating sulfur or the sulfur-based compound on the outer surface and inside of the carbon, and can optionally be subjected to a step of adjusting the diameter of carbon before, after, or both before and after the impregnating step. The impregnating step may be carried out by mixing carbon with a powder of sulfur or the sulfur-based compound and then heating to impregnate carbon with molten sulfur or the sulfur-based compound, and such mixing can be performed by a dry ball mill method, a dry jet mill method or a dry Dyno-mill method. According to one embodiment of the present invention, the sulfur-carbon composite contains 60 to 90 parts by weight of sulfur or the sulfur-based compound based on 100 parts by weight of the sulfur-carbon composite. When the content of sulfur or the sulfur-based compound in the sulfur-carbon composite is adjusted within the above range, electrons are appropriately supplied to the non-conductive sulfur or sulfur-based compound while maintaining the content of the sulfur or sulfur-based compound at a high ratio. The sulfur-carbon composite has a porosity of more than a certain level because it has a form in which sulfur or the sulfur-based compound is supported on porous carbon. Accordingly, even if the positive electrode active material layer is sufficiently rolled to the extent that the structure of the sulfur-carbon composite is still maintained, the impregnation property of the electrolyte solution in the positive electrode active material layer is not deteriorated.

The electrically conductive material may be selected from graphites such as natural graphite or artificial graphite; carbon blacks such as carbon black, acetylene black, Ketjen black, channel black, furnace black, lamp black, or thermal black; electrically conductive fibers such as carbon fiber or metal fiber; carbon fluoride; metal powders such as aluminum or nickel powder; electrically conductive whiskers such as zinc oxide and potassium titanate; electrically conductive metal oxides such as titanium oxide; or polyphenylene derivatives, but is not necessarily limited thereto. The ratio of the electrically conductive material in the positive electrode active material layer may be adjusted in consideration of the performance of a target battery. According to one embodiment of the present invention, the positive electrode active material layer contains 0.05 to 20 parts by weight of the electrically conductive material based on 100 parts by weight of the positive electrode active material layer.

The binder is a component that assists in bonding of the positive electrode active material and the electrically conductive material and bonding to the current collector, and is not particularly limited. For example, the binder may be at least one selected from the group consisting of vinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropyl cellulose, regenerated cellulose, polyvinyl pyrrolidone, polytetrafluoroethylene, polyethylene, polypropylene, polyacrylic acid, ethylene-propylene-diene monomer (EPDM), sulfonated-EPDM, styrene-butadiene rubber (SBR), and fluorine rubber, or mixtures of two or more thereof. According to one embodiment of the present invention, the positive electrode active material layer contains 1 to 30 parts by weight of the binder based on 100 parts by weight of the positive electrode active material layer.

The positive electrode active material layer has an intaglio pattern on the surface. The intaglio pattern is formed by irradiating a laser on the surface of the positive electrode active material layer, and a specific manufacturing method will be described later.

Since the positive electrode active material layer can secure pores in a desired shape through the intaglio pattern, it is preferable that the positive electrode active material layer has low porosity before the intaglio pattern is formed. Here, the porosity is a ratio of the pore volume to the total volume of the positive electrode active material layer and is usually expressed as a percentage. In this specification, when calculating the porosity of the positive electrode active material layer, it is considered that the shape of the positive electrode active material layer itself is changed through patterning, so that pores artificially formed by patterning are not comprised in the total volume and pore volume of the positive electrode active material layer. Therefore, the positive electrode active material layer maintains the same porosity before and after patterning. According to one embodiment of the present invention, the positive electrode active material layer has a porosity of less than 70%, preferably 50 to 65%, more preferably 55 to 62%. In a general lithium-sulfur secondary battery, if the porosity is maintained below 70%, it is not desirable because material movement by penetration of the electrolyte may not be easy. However, in the lithium-sulfur secondary battery according to the present invention, since a passage for material movement can be secured through patterning, the performance of the battery is not significantly deteriorated even under a low porosity condition. Since sulfur-carbon composite, which is mainly used as a positive electrode active material in lithium-sulfur secondary batteries, has a porosity of more than a certain level, the positive electrode active material layer with a porosity of less than 70% is prepared by coating the slurry for forming the positive electrode active material layer on the positive electrode current collector and then rolling them, and even when rolling, the porosity of the positive electrode active material layer does not fall below that of the sulfur-carbon composite. When the entire coated slurry for forming the positive electrode active material layer is rolled with the same pressure, the porosity of the inside of the positive electrode active material layer can be uniformly maintained. In addition, as described above, since the patterning does not affect the porosity of the positive electrode active material layer, the porosity of the positive electrode active material is maintained uniformly even after patterning.

Figure 1A:
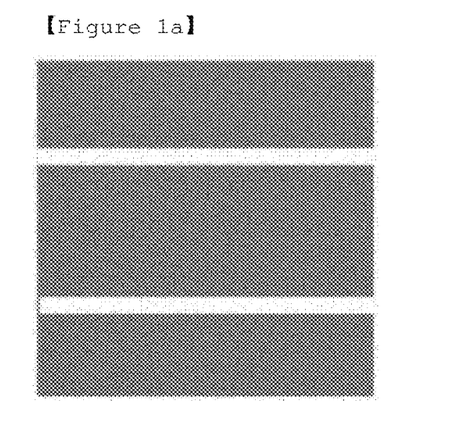
FIGS. 1a to 1f are images showing a plan view of the positive electrode active material layer having an exemplary intaglio pattern shape.
Figure 1B:
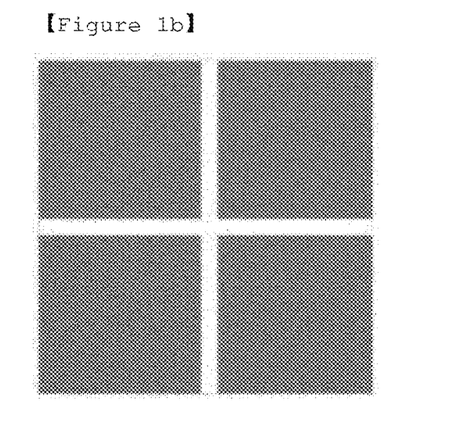
Figure 1C:
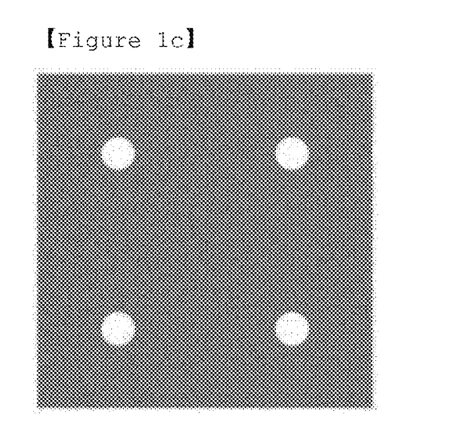
Figure 1D:
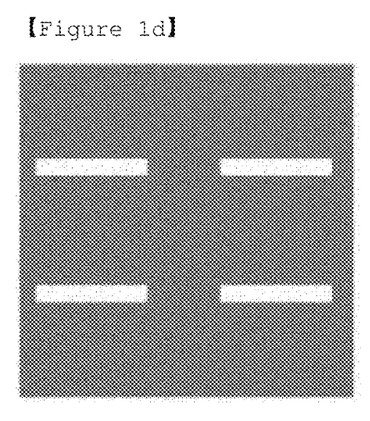
Figure 1E:
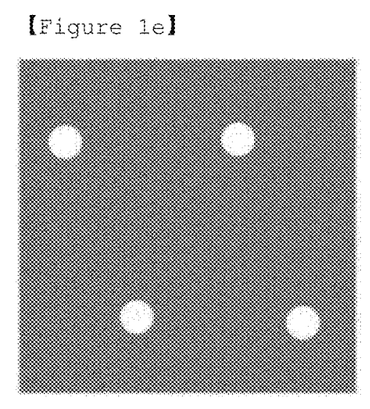
Figure 1F:
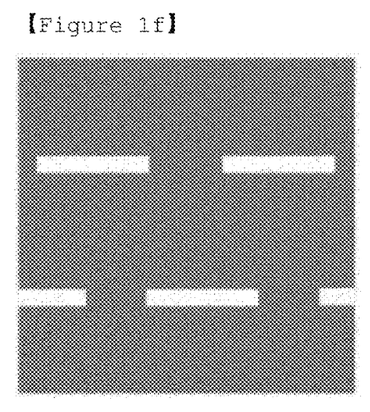
Figure 2:
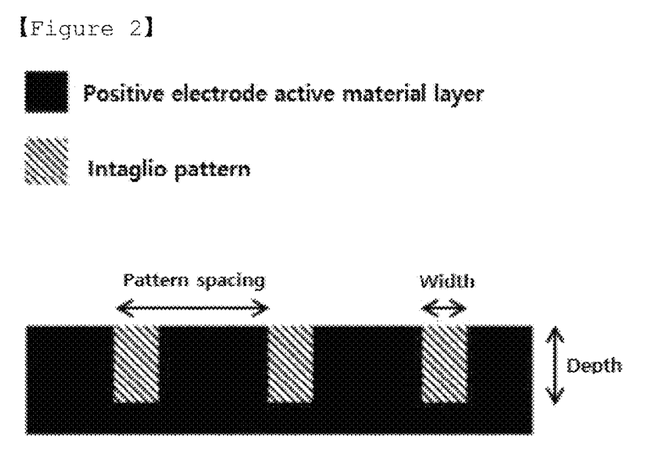
FIG. 2 is an image showing a cross-sectional view of the positive electrode active material layer in which an intaglio pattern is formed.

The intaglio pattern can be manufactured in various shapes and sizes. According to one embodiment of the present invention, the intaglio pattern may have a shape of a plurality of straight lines or dashed lines horizontal or perpendicular to each other, or may have a shape of a plurality of dots formed to be spaced apart from each other. Exemplary intaglio pattern shapes applicable in the present invention are shown in FIGS. 1a to 1f. In order to improve the performance of material movement by forming an intaglio pattern on the positive electrode active material layer, it is important to arrange the intaglio pattern shapes at a regular spacing. According to one embodiment of the present invention, it may be desirable that the intaglio pattern is located within 200 μm, preferably within 175 μm, and more preferably within 150 μm based on a predetermined point located on the surface of the positive electrode active material layer. Here, the description that the intaglio pattern is located within 200 μm based on a predetermined point means that the distance of the straight line to the nearest intaglio pattern at any point on the surface of the positive electrode active material layer is less than 200 μm. If the intaglio pattern exceeds 200 μm based on a predetermined point located on the surface of the positive electrode active material layer, the electrochemical reaction proceeds unevenly around that point during charging/discharging of the battery, and the result can be confirmed through irregularities on the surface of the negative electrode facing it after a number of cycles have progressed. Along with the shape of the intaglio pattern, the size of the intaglio pattern also plays an important role in improving the performance of the battery. The size of the intaglio pattern may be determined in consideration of factors such as width, depth, and volume of the intaglio pattern. FIG. 2 is an image showing a cross-sectional view of the positive electrode active material layer in which an intaglio pattern is formed. As shown in the image above, the width of the intaglio pattern refers to the length of the intaglio pattern in a direction horizontal to the surface of the positive electrode active material layer, and the depth of the intaglio pattern refers to the length of the intaglio pattern in the direction perpendicular to the surface of the positive electrode active material layer. In a specific shape, if the shape of the intaglio pattern is a straight line or dashed line based on the surface of the positive electrode active material layer, the width of the intaglio pattern refers to the thickness of the line, and if the shape of the intaglio pattern is a dot, the width of the intaglio pattern refers to the diameter of the dot. According to one embodiment of the present invention, the intaglio pattern may have a width of 1 to 100 μm, preferably 30 to 100 μm, more preferably 60 to 100 μm. If the width of the intaglio pattern is less than 1 μm, it is not preferable because the mobility of a material having a large molecular weight such as polysulfide formed during an electrochemical reaction is not good. If the width of the intaglio pattern is more than 100 μm, the overall volume of the intaglio pattern is large when placing the intaglio pattern in consideration of the spacing, so there is a problem that positive electrode active material cannot be highly loaded. According to one embodiment of the present invention, the intaglio pattern may have a depth of 30 to 99%, preferably 50 to 97%, more preferably 70 to 95% based on the thickness of the positive electrode active material layer. If the depth of the intaglio pattern is less than 30% based on the thickness of the positive electrode active material layer, since it is not easy to move the material at a deep point in the positive electrode active material layer located close to the positive electrode current collector, the effect of improving the performance of the battery may be reduced. In the case of forming a pattern with a roller with irregularities, the width of the intaglio pattern cannot be formed narrowly to have a micro unit, and if high pressure is applied to deeply form the intaglio pattern, there is a risk that the basic structure of the positive electrode active material may be destroyed. According to one embodiment of the present invention, the volumetric ratio of the positive electrode active material layer and the intaglio pattern may be 4:1 to 40:1, preferably 4:1 to 20:1, more preferably 4:1 to 10:1. If several intaglio patterns are individually formed on the positive electrode active material layer, the volumetric ratio is calculated based on the total volume of the intaglio pattern. If the ratio of the positive electrode active material layer is less than 4:1, it is not desirable because the positive electrode active material cannot be highly loaded. If the ratio of the positive electrode active material layer exceeds 40:1, it is not preferable because the effect of improving the performance of the battery through patterning is insignificant.

Figure 9:
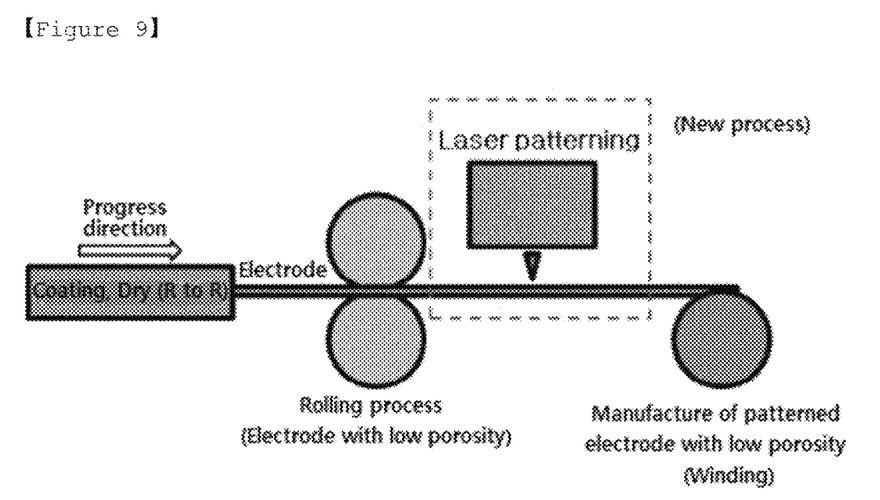
FIG. 9 is a schematic diagram showing a method of manufacturing a positive electrode for a lithium-sulfur secondary battery according to the present invention.

Method of Manufacturing Positive Electrode Active Material Layer with Pattern Formed Therein The present invention provides a method of manufacturing a positive electrode for a lithium-sulfur secondary battery comprising the steps of (1) forming a positive electrode active material layer before rolling by applying a slurry for forming a positive electrode active material on the current collector, (2) forming a positive electrode active material layer after rolling by rolling the positive electrode active material layer before rolling, and (3) forming a positive electrode active material layer with an intaglio pattern formed by irradiating a laser on the surface of the positive electrode active material layer after rolling, wherein the positive electrode active material layer after rolling has a porosity of 50 to 65%. FIG. 9 shows the method of manufacturing the positive electrode for the lithium-sulfur secondary battery.

According to an embodiment of the present invention, a method of manufacturing a positive electrode for a lithium-sulfur secondary battery may comprises a step of (1) forming a positive electrode active material layer before rolling by applying a slurry for forming a positive electrode active material on the current collector.

The positive electrode active material layer before rolling in step (1) may have a porosity of 60 to 80%, preferably 60 to 75%, and more preferably a porosity of 64 to 73%. If the porosity of the positive electrode active material layer before rolling is less than the above range, there is a problem that it may not be sufficiently rolled in the rolling step, and even if rolling is possible, the impregnation property of the electrolyte solution in the positive electrode active material layer may be deteriorated. If the porosity of the positive electrode active material layer before rolling exceeds the above range, the porosity is high even after rolling, and it is difficult to obtain the effect of improving the performance of the battery of the present invention. Therefore, it is preferable to satisfy the above range.

In addition, the slurry for forming the positive electrode active material in step (1) may comprise a positive electrode active material, an electrically conductive material, and a binder. The constitution of the slurry for forming the positive electrode active material is as described above.

According to one embodiment of the present invention, the method of manufacturing the positive electrode for the lithium-sulfur secondary battery may comprise a step of (2) forming a positive electrode active material layer after rolling by rolling the positive electrode active material layer before rolling.

The positive electrode active material layer after rolling may have a porosity of less than 70%, preferably 50 to 65%, and more preferably 55 to 62%. If the porosity of the positive electrode active material after the rolling is less than the above range, there is a problem that it is difficult to show sufficient discharging capacity when applied to a lithium-sulfur secondary battery. If the porosity of the positive electrode active material after rolling exceeds the above range, there is a problem that the energy density per unit volume is decreased when applied to a lithium-sulfur secondary battery. Therefore, it is preferable that the porosity of the positive electrode active material after rolling satisfies the above range. In a general lithium-sulfur secondary battery, if the porosity is maintained below 70%, it is not desirable because material movement may not be easy due to penetration of the electrolyte solution. However, in the lithium-sulfur secondary battery according to the present invention, since a passage for material movement can be secured through the formation of the intaglio pattern, the performance of the battery is not significantly deteriorated even under a low porosity condition. Since sulfur-carbon composite, which is mainly used as a positive electrode active material in lithium-sulfur secondary batteries, has a porosity of more than a certain level, the positive electrode active material layer with a porosity of less than 70% is prepared by coating the slurry for forming the positive electrode active material layer on the positive electrode current collector and then rolling them. Since the entire positive electrode active material layer can be rolled with the same pressure by the rolling in step (2), the porosity of the inside of the positive electrode active material layer can be uniformly maintained.

Meanwhile, as described above, since the formation of the pattern does not affect the porosity of the positive electrode active material layer, the porosity of the positive electrode active material layer is uniformly maintained even after the formation of the pattern.

In addition, the rolling in step (2) may be performed through a roll-press process. The roll-press process may be performed by passing the current collector, on which the positive electrode active material layer before rolling is formed, through a pair of rollers. By the roll-press process, the entire process of manufacturing the positive electrode for the lithium-sulfur secondary battery may be continuously performed. In addition, the pressure applied during the roll-press process may be 300 to 1000 KgF. When the pressure applied during the roll-press process is adjusted within the above range, the porosity of the positive electrode active material layer can be reduced by sufficiently rolling the positive electrode active material layer without breaking the positive electrode active material layer after rolling. In addition, due to this, the energy density per unit volume can be improved.

In addition, the thickness of the positive electrode active material layer after rolling in step (2) may be 80 to 99%, preferably 85 to 96%, and more preferably 85.9 to 95.8% relative to the thickness of the positive electrode active material layer before rolling in step (1). If the thickness of the positive electrode active material layer after rolling is less than the above range, the positive electrode active material layer may be crushed. If the thickness of the positive electrode active material layer after the rolling exceeds the above range, the positive electrode active material layer is not sufficiently rolled, so that the energy density per unit volume cannot be sufficiently improved. Therefore, it is preferable that the thickness of the positive electrode active material layer after rolling satisfies the above range.

According to one embodiment of the present invention, the method of manufacturing the positive electrode for the lithium-sulfur secondary battery may comprise a step of (3) forming a positive electrode active material layer with an intaglio pattern formed by irradiating a laser on the surface of the positive electrode active material layer after rolling.

The laser irradiated in step (3) may have a wavelength range of 300 to 2000 nm, and its frequency may be 10 to 1000 kHz.

In addition, the loading loss rate of the positive electrode active material layer by step (3) may be 30% or less, preferably 5 to 20%, and more preferably 10 to 20%. The loading loss rate represents the volume of the positive electrode active material layer removed by formation of an intaglio pattern relative to the volume of the entire positive electrode active material layer after rolling. If several intaglio patterns are individually formed on the positive electrode active material layer, the volumetric ratio is calculated based on the total volume of the intaglio pattern. If the loading loss rate of the positive electrode active material layer is less than the above range, the effect of improving the performance of the battery through the formation of an intaglio pattern is insignificant. If the loading loss rate of the positive electrode active material layer exceeds the above range, since the positive electrode active material cannot be sufficiently loaded into the positive electrode active material layer, the discharging capacity of the lithium-sulfur secondary battery is insufficient. Therefore, it is preferable that the loading loss rate satisfies the above range.

In addition, the intaglio pattern formed by step (3) may be manufactured in various shapes and sizes. Such shapes and sizes are as described above.

Lithium-Sulfur Secondary Battery

The present invention provides a lithium-sulfur secondary battery with improved performance by forming a positive electrode active material layer with the above pattern formed on the current collector to prepare a positive electrode, and then adding the constitution of a negative electrode, a separator, and an electrolyte solution.

The positive electrode constituting the lithium-sulfur secondary battery according to the present invention includes a positive electrode current collector and a positive electrode active material layer formed on the positive electrode current collector. The positive electrode active material layer is manufactured by finally patterning according to the above description. The positive electrode current collector is not particularly limited as long as it is generally used in the preparation of a positive electrode. According to one embodiment of the present invention, the positive electrode current collector may be at least one material selected from the group consisting of stainless steel, aluminum, nickel, titanium, and sintered carbon, and if necessary, the surfaces of the above-mentioned materials may be treated with carbon, nickel, titanium or silver. According to one embodiment of the present invention, the shape of the positive electrode current collector may be selected from film, sheet, foil, net, porous body, foam and nonwoven fabric. The thickness of the positive electrode current collector is not particularly limited and may be set in a suitable range in consideration of the mechanical strength of the positive electrode, the productivity, the capacity of the battery and the like.

A method of forming the positive electrode active material layer on the positive electrode current collector may be a known coating method and is not particularly limited. For example, the coating method may be a bar coating method, a screen coating method, a doctor blade method, a dipping method, a reverse roll method, a direct roll method, a gravure method, or an extrusion method. The amount of the positive electrode active material layer to be coated on the positive electrode current collector is not particularly limited, and is adjusted in consideration of the thickness of the finally desired positive electrode active material layer. Also, before or after the process of forming the positive electrode active material layer, a known process required for the preparation of the positive electrode, for example, a rolling or drying process, can be performed.

The electrolyte solution constituting the lithium-sulfur secondary battery according to the present invention is not particularly limited as long as it is a non-aqueous solvent serving as a medium through which ions involved in the electrochemical reaction of the battery can move. According to one embodiment of the present invention, the solvent may be a carbonate-based solvent, an ester-based solvent, an ether-based solvent, a ketone-based solvent, an alcohol-based solvent, or an aprotic solvent. Examples of the carbonate-based solvent may specifically comprise dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically comprise methyl acetate, ethyl acetate, n-propyl acetate, 1,1-dimethyl ethyl acetate, methyl propionate, ethyl propionate, γ-butyrolactone, decanolide, valerolactone, mevalonolactone, or carprolactone, etc. Examples of the ether-based solvent may specifically comprise diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, or polyethylene glycol dimethyl ether, etc. Examples of the ketone-based solvent may specifically include cyclohexanone, etc. Examples of the alcohol-based solvent may specifically comprise ethylalcohol, or isopropylalcohol, etc. Examples of the aprotic solvent may specifically comprise nitriles such as acetonitrile, amides such as dimethylformamide, dioxolanes such as 1,3-dioxolane (DOL), or sulfolane, etc. The non-aqueous organic solvents may be used alone or in combination of one or more. The mixing ratio when using in combination of one or more can be appropriately adjusted depending on the desired performance of the battery. In particular, a mixture of 1,3-dioxolane and dimethoxyethane in a volumetric ratio of 1:1 may be preferable.

The negative electrode constituting the lithium-sulfur secondary battery according to the present invention comprises a negative electrode current collector and a negative electrode active material layer formed on the negative electrode current collector.

The negative electrode active material layer comprises a negative electrode active material, a binder, and an electrically conductive material. The negative electrode active material may be a material capable of reversibly intercalating or deintercalating lithium ion ($Li^+$), a material capable of reacting with lithium ion to reversibly form a lithium-containing compound, lithium metal or a lithium alloy. The material capable of reversibly intercalating or deintercalating lithium ion ($Li^+$) may be, for example, crystalline carbon, amorphous carbon or mixtures thereof. The material capable of reacting with lithium ion ($Li^+$) to reversibly form a lithium-containing compound may be, for example, tin oxide, titanium nitrate or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The binder, the electrically conductive material, and the negative electrode current collector may be selected with reference to the configuration in the positive electrode described above, but are not necessarily limited thereto. In addition, the method of forming the positive electrode active material layer on the positive electrode current collector is by a known coating method as in the positive electrode, and is not particularly limited.

The separator for the lithium-sulfur secondary battery according to the present invention is a physical separator having a function of physically separating electrodes. The separator can be used without special restrictions, as long as it is used as a conventional separator. Particularly, a separator with excellent electrolyte solution humidification ability while exhibiting low resistance to ion migration of electrolyte solution is preferable. The separator enables the lithium ion to be transported between the positive electrode and the negative electrode while separating or insulating the positive electrode and the negative electrode from each other. Such separator may be made of a porous, nonconductive or insulating material having a porosity of 30 to 50%. Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used, and a non-woven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

The lithium-sulfur secondary battery of the present invention can be manufactured by disposing a separator between a positive electrode and a negative electrode to form an electrode assembly and inserting the electrode assembly into a cylindrical battery case or a rectangular battery case, and then injecting an electrolyte. Alternatively, the lithium-sulfur secondary battery of the present invention can be manufactured by laminating the electrode assembly, impregnating the electrode assembly with the electrolyte, putting the obtained result into a battery case and then sealing it.

Hereinafter, preferred examples will be described in order to facilitate understanding of the present invention. However, the following examples are provided to facilitate understanding of the present invention, but the present invention is not limited thereto.

EXAMPLES

Example 1

Sulfur and carbon nanotubes (CNANO company, MWCNT) were mixed in a weight ratio of 75:25 to prepare a sulfur-carbon composite as a positive electrode active material. A slurry containing sulfur-carbon composite (positive electrode active material), Denka black (electrically conductive material), and polyacrylic acid (binder, Sigma Aldrich company, Mv~450 k) in a weight ratio of 88:5:7 was applied to aluminum foil so that the loading amount per unit area was 5.5 mAh/cm$^2$, and dried to prepare a positive electrode active material layer before rolling. At this time, the porosity of the positive electrode active material layer before rolling was 75%. Thereafter, through a roll-press process, the electrode was passed through the rolls by applying a pressure of 500 KgF to the positive electrode active material layer, while narrowing the gap between the rolls until the porosity of the positive electrode active material layer becomes 62%, to manufacture a positive electrode active material layer after rolling. Here, the porosity of the positive electrode active material layer was calculated by measuring the thickness of the positive electrode active material layer through a material thickness measurement equipment (TESA, u-hite), and then using the true density of the positive electrode active material layer measured by a measuring equipment (Microtrac, BELPycno) for the true density of the material. Here, the loading amount was obtained by calculating the discharging capacity per 1 cm$^2$ of area of the electrode, while assuming that 1 g of sulfur in the positive electrode active material layer formed on the current collector has a discharging capacity of 1200 mAh/g.

Thereafter, the positive electrode active material layer after rolling was line-patterned with a laser (wavelength: 1064 nm, output: 20 W, frequency: 20~80 KHz, scan speed: 1000~2000 cm/s) at a spacing of 400 μm, so that the loading loss rate was 10%, thereby having manufactured a positive electrode active material layer with a pattern formed. The intaglio pattern formed by the laser had a width of 80 μm and a depth of 60% based on the thickness of the positive electrode active material layer. In addition, the volumetric ratio of the positive electrode active material layer and the intaglio pattern was 9:1.

The positive electrode prepared by the above-described method was positioned so as to face the negative electrode, a lithium foil having a thickness of 45 μm, and then a polyethylene separator having a thickness of 20 μm and a porosity of 45% was interposed between the positive electrode and the negative electrode. Thereafter, they were placed in a coin battery case, and an electrolyte solution in which 1,3-dioxolane and dimethoxyethane were mixed in a 1:1 weight ratio was injected to manufacture a lithium-sulfur secondary battery.

Example 2

A lithium-sulfur secondary battery was manufactured in the same manner as in Example 1, except that the rolling is performed until the porosity of the positive electrode active material layer becomes 60%.

Example 3

A lithium-sulfur secondary battery was manufactured in the same manner as in Example 1, except that the rolling is performed until the porosity of the positive electrode active material layer becomes 55%, and when forming the pattern, the loading loss rate is adjusted to 20%, and after the formation of the pattern, the width of the intaglio pattern is adjusted to 100 μm, the depth of the intaglio pattern is adjusted to 95%, and the volumetric ratio of the positive electrode active material layer and the intaglio pattern is adjusted to 4:1. Considering the amount of loading lost due to pattern formation in Examples 2 and 3, the loading amounts per unit volume in Example 2 and Example 3 are substantially the same. The unit volume is based on the volume of the positive electrode active material layer before pattern formation.

Comparative Example 1

A lithium-sulfur secondary battery was manufactured in the same manner as in Example 1, except that the rolling was performed until the porosity of the positive electrode active material layer becomes 70%.

Comparative Example 2

A lithium-sulfur secondary battery was manufactured in the same manner as in Example 1, except that the porosity of the positive electrode active material layer is adjusted to 73%, and thereafter the rolling and the pattern formation are not performed. Considering the amount of loading lost due to pattern formation in Comparative Example 1, the loading amounts per unit volume of Comparative Example 1 and Comparative Example 2 are substantially the same.

Comparative Example 3

A lithium-sulfur secondary battery was manufactured in the same manner as Example 1, except that the porosity of the positive electrode active material layer is adjusted to 69%, and thereafter the rolling and the pattern formation are not performed.

Comparative Example 4

A lithium-sulfur secondary battery was manufactured in the same manner as Example 1, except that the porosity of the positive electrode active material layer is adjusted to 66%, and thereafter the rolling and the pattern formation are not performed. Considering the amount of loading lost due to pattern formation in Example 2, the loading amounts per unit volume of Example 1 and Comparative Example 4 are substantially the same.

Comparative Example 5

A lithium-sulfur secondary battery was manufactured in the same manner as Example 1, except that the porosity of the positive electrode active material layer is adjusted to 64%, and thereafter the rolling and the pattern formation are not performed. Considering the amount of loading lost due to pattern formation in Examples 2 and 3, the loading amounts per unit volume of Examples 2 and 3 and Comparative Example 5 are substantially the same.

Comparative Example 6

A lithium-sulfur secondary battery was manufactured in the same manner as Example 1, except that the porosity of the positive electrode active material layer is adjusted to 60%, and thereafter the rolling and the pattern formation are not performed. The positive electrode active material layer has the same porosity as Example 2.

Comparative Example 7

A lithium-sulfur secondary battery was manufactured in the same manner as in Example 1, except that line patterning with the same width and depth as Example 1 was performed at a spacing of 500 μm.

Experimental Example

Experimental Example 1: Thermogravimetric Analysis (TGA)

Figure 3:
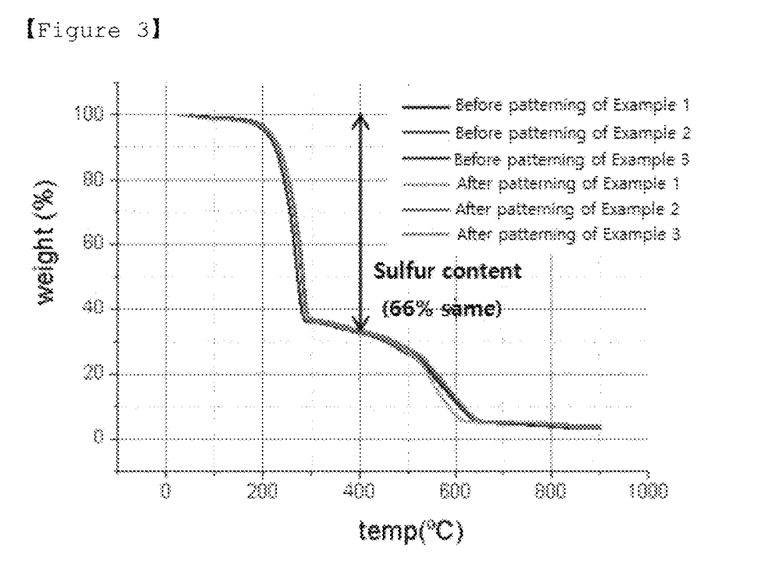
FIG. 3 is a graph showing the results of thermogravimetric analysis of the positive electrode active material layers before and after pattern formation according to Examples 1 to 3.

For Examples 1 to 3, the mass of the positive electrode active material layer before and after pattern formation was measured with a thermogravimetric analyzer (TGA), while raising the temperature from room temperature to 900° C. at a rate of 10° C. per minute in the atmosphere, and the results are shown in FIG. 3.

According to FIG. 3, the content of sulfur in the positive electrode active material layer in each example was equally 66% by weight, and these results indicate that sulfur is not volatilized by the laser pattern formation process.

Experimental Example 2-1: Initial Discharging Curve of a Lithium-Sulfur Secondary Battery The lithium-sulfur secondary batteries according to Example 1 and Comparative Examples 3 and 4 are initially charged/discharged at 0.1 C rate and the charging/discharging profiles of the battery potential for specific capacity were shown in FIG. 4.

Figure 4:
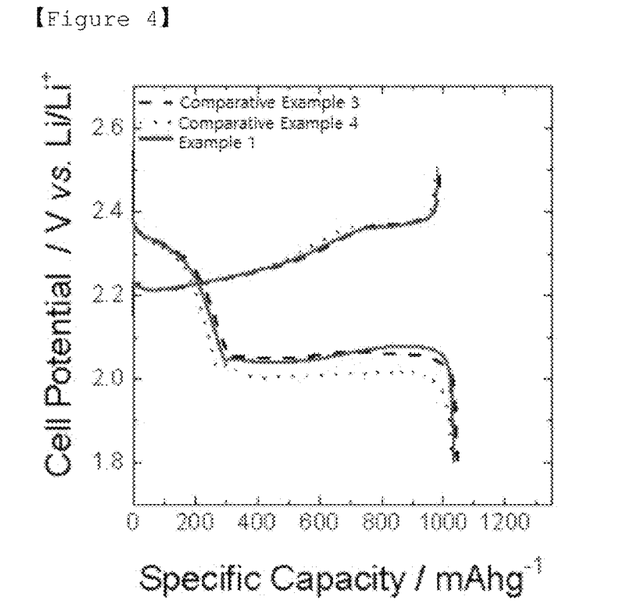
FIG. 4 is a graph showing the charging/discharging profile of the potential of the batteries with respect to the specific capacity obtained by initially charging/discharging the lithium-sulfur secondary batteries according to Example 1 and Comparative Examples 3 and 4 at a 0.1 C rate.

According to FIG. 4, it was confirmed that in the case of the lithium-sulfur secondary battery according to Example 1, a discharging curve is formed with a higher battery potential than that of the lithium-sulfur secondary battery according to Comparative Example 4, and with a battery potential at the same level as the lithium-sulfur secondary battery according to Comparative Example 3, which had a greater porosity. In the case of the lithium-sulfur secondary battery according to Example 1, although the loading amount of the positive electrode active material per unit volume is substantially the same as that of the lithium-sulfur secondary battery according to Comparative Example 4 and the thickness of the positive electrode active material layer is thinner compared to the lithium-sulfur secondary battery according to Comparative Example 4, since the lithium-sulfur secondary battery according to Example 1 shows the higher energy density compared to the lithium-sulfur secondary battery according to Comparative Example 4, the lithium-sulfur secondary battery according to Example 1 shows much higher energy density per unit volume than the lithium-sulfur secondary battery according to Comparative Example 4. In addition, it can be seen that although the lithium-sulfur secondary battery according to Example 1 has a larger loading amount of positive electrode active material per unit volume and has a much thinner positive electrode active material layer thickness than the lithium-sulfur secondary battery according to Comparative Example 3, since the lithium-sulfur secondary battery according to Example 1 shows the same level of energy density, the lithium-sulfur secondary battery according to Example 1 has a much higher energy density per unit volume than the lithium-sulfur secondary battery according to Comparative Example 3. The increase in energy density per unit volume means that the battery performance is improved.

Experimental Example 2-2: Initial Discharging Curve of Lithium-Sulfur Secondary Battery The lithium-sulfur secondary batteries according to Examples 2 and 3 and Comparative Example 5 are initially charged/discharged at 0.1 C rate and the charging/discharging profiles of the battery potential for specific capacity were shown in FIG. 5.

Figure 5:
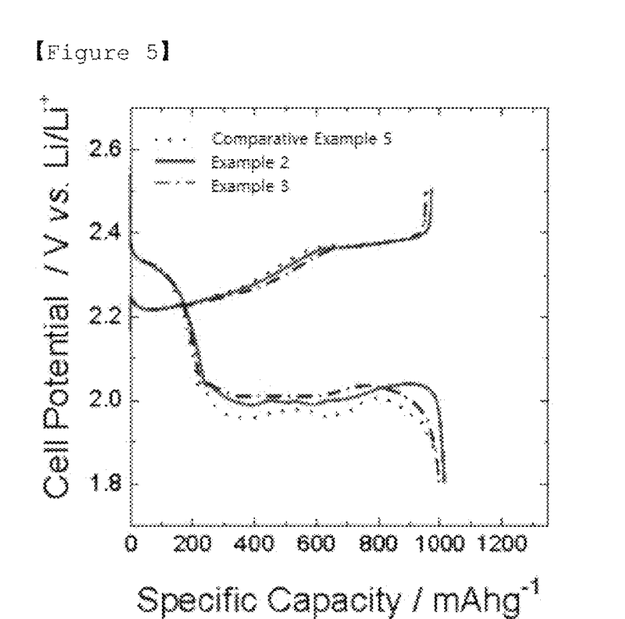
FIG. 5 is a graph showing the charging/discharging profile of the potential of the batteries with respect to the specific capacity obtained by initially charging/discharging the lithium-sulfur secondary batteries according to Examples 2 and 3 and Comparative Example 5 at a 0.1 C rate.

According to FIG. 5, it was confirmed that in the case of the lithium-sulfur secondary batteries according to Examples 2 and 3, a discharging curve is formed with a higher battery potential than that of the lithium-sulfur secondary battery according to Comparative Example 5. It can be seen that in the case of the lithium-sulfur secondary batteries according to Examples 2 and 3, although the loading amount of the positive electrode active material per unit volume is substantially the same as that of the lithium-sulfur secondary battery according to Comparative Example 5 and the thickness of the positive electrode active material layer is thinner compared to the lithium-sulfur secondary battery according to Comparative Example 5, since the lithium-sulfur secondary batteries according to Examples 2 and 3 show the higher energy density than the lithium-sulfur secondary battery according to Comparative Example 5, the lithium-sulfur secondary batteries according to Examples 2 and 3 show much higher energy density per unit volume than the lithium-sulfur secondary battery according to Comparative Example 5. In particular, although the lithium-sulfur secondary battery according to Example 3 has a very low porosity of 55% in the positive electrode active material layer, the lithium-sulfur secondary battery according to Example 3 could have the same level of performance as the battery comprising the positive electrode active material layer with high porosity.

Figure 6:
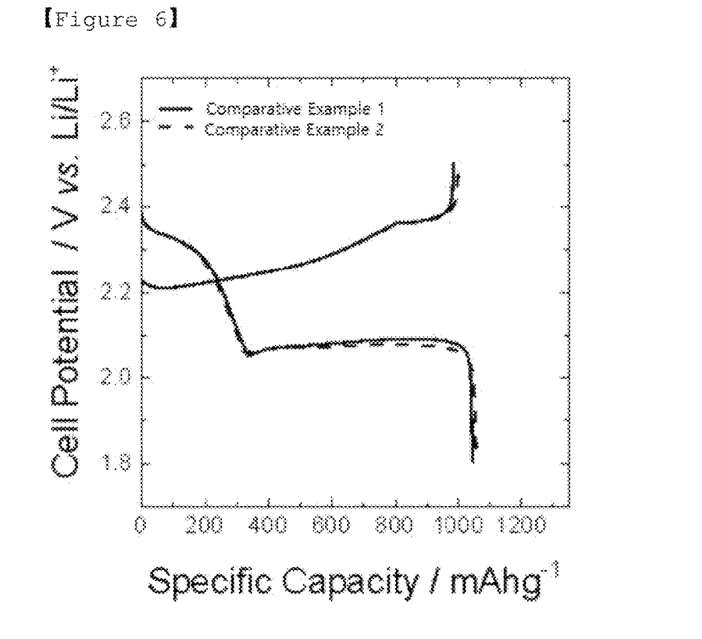
FIG. 6 is a graph showing the charging/discharging profile of the potential of the batteries with respect to the specific capacity obtained by initially charging/discharging the lithium-sulfur secondary batteries according to Comparative Examples 1 and 2 at a 0.1 C rate.

Experimental Example 2-3: Initial Discharging Curve of Lithium-Sulfur Secondary Battery The lithium-sulfur secondary batteries according to Comparative example 1 and 2 are initially charged/discharged at 0.1 C rate and the charging/discharging profiles of the battery potential for specific capacity were shown in FIG. 6. According to FIG. 6, it was confirmed that in the case of the lithium-sulfur secondary battery according to Comparative Example 1, a discharging curve is formed with a battery potential similar to that of the lithium-sulfur secondary battery according to Comparative Example 2. The lithium-sulfur secondary battery according to Comparative Example 1 has substantially the same loading amount of positive electrode active material per unit volume as the lithium-sulfur secondary battery according to Comparative Example 2 and a thinner positive electrode active material layer thickness compared to the lithium-sulfur secondary battery according to Comparative Example 2, since the lithium-sulfur secondary battery according to Comparative Example 1 exhibits an energy density similar to that of the lithium-sulfur secondary battery according to Comparative Example 2, the lithium-sulfur secondary battery according to Comparative Example 1 does not have a significantly higher energy density per unit volume than the lithium-sulfur secondary battery according to Comparative Example 2.

Experimental Example 2-4: Initial Discharging Curve of Lithium-Sulfur Secondary Battery The lithium-sulfur secondary batteries according to Example 2 and Comparative Example 6 are initially charged/discharged at 0.1 C rate and the charging/discharging profiles of the battery potential for specific capacity were shown in FIG. 7.

Figure 7:
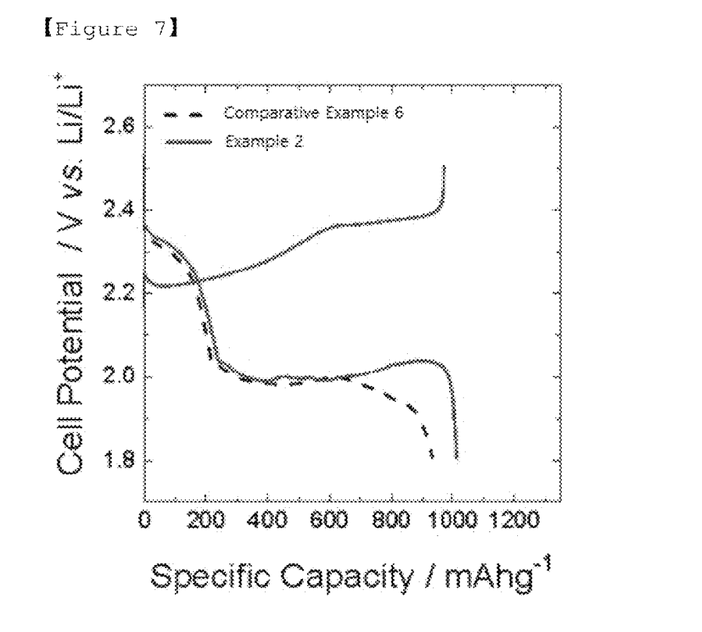
FIG. 7 is a graph showing the charging/discharging profile of the potential of the batteries with respect to the specific capacity obtained by initially charging/discharging the lithium-sulfur secondary batteries according to Example 2 and Comparative Example 6 at a 0.1 C rate.

According to FIG. 7, it was confirmed that even when the porosity of the positive electrode active material layer is the same, the lithium-sulfur secondary battery with the pattern formed (Example 2) exhibits superior performance in terms of energy density and specific discharging capacity compared to the lithium-sulfur secondary battery without a pattern (Comparative Example 6).

Experimental Example 3: Surface Analysis of Negative Electrode

Figure 8A:
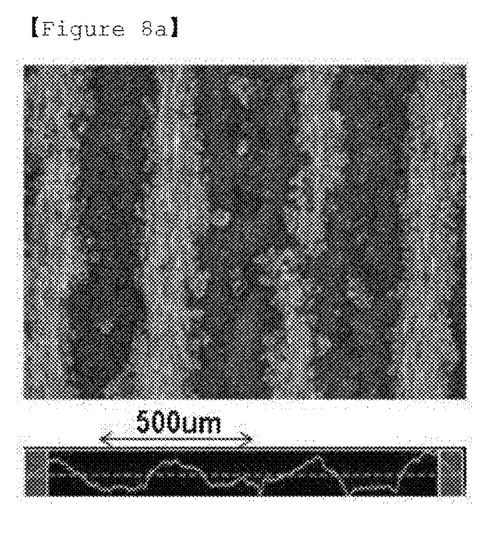
FIGS. 8a and 8b are images obtained by analyzing the surfaces of negative electrodes after charging/discharging lithium-sulfur secondary batteries according to Example 1 and Comparative Example 6 for 50 cycles at a 0.1 C rate.
Figure 8B:
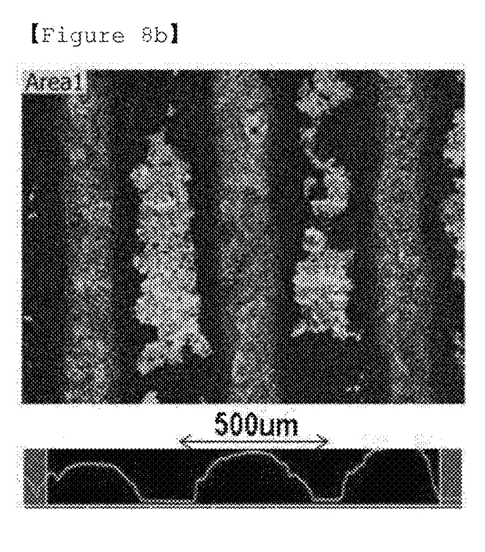

The lithium-sulfur secondary batteries according to Example 1 and Comparative Example 6 were charged/discharged for 50 cycles at 0.1 C rate, and then, the negative electrode surface was analyzed with a laser surface profiler, and the results are shown in FIG. 8a (Example 1) and 8b (Comparative Example 6).

According to FIGS. 8a and 8b, if the spacing between the intaglio patterns is 500 μm, the midpoint between the intaglio patterns on the surface of the positive electrode active material layer where the intaglio pattern is not formed is as far as 210 μm from the intaglio pattern, making it difficult for the electrochemical reaction to be dispersed by the intaglio pattern, and thus the negative electrode active material facing the corresponding point was rapidly consumed, causing non-uniformity of the surface of the negative electrode such as exposure of the negative electrode current collector (FIG. 8b). On the contrary, if the spacing between intaglio patterns is 400 μm, the midpoint between the intaglio patterns on the surface of the positive electrode active material layer where the intaglio pattern is not formed was approached by a distance from the intaglio pattern of 160 μm, so that the electrochemical reaction was efficiently dispersed by the intaglio pattern, and thus there was no problem such as exposure of the negative electrode current collector (FIG. 8a).

As described above, in order to eliminate the non-uniformity of the electrochemical reaction due to the formation of the intaglio pattern, the pattern formation operation should be performed so that the spacing between intaglio patterns is less than 500 μm elaborately, and it is difficult to implement such an elaborate pattern with a roll press patterning method other than a laser patterning method. In addition, the roll press patterning method unevenly rolls the positive electrode active material layer depending on the shape of the irregularities of the roll press, so that the porosity of the positive electrode active material layer after patterning cannot be uniformly maintained.

All simple modifications to changes of the present invention belong to the scope of the present invention, and the specific scope of protection of the present invention will be made clear by the appended claims.

The invention claimed is:

1. A positive electrode for a lithium-sulfur secondary battery comprising:
   a positive electrode active material layer with an intaglio pattern formed therein,
   wherein the positive electrode active material layer has a porosity of 50 to 65%,
   wherein a volumetric ratio of the positive electrode active material layer and the intaglio pattern is 4:1 to 40:1.

2. The positive electrode for the lithium-sulfur secondary battery according to claim 1, wherein the intaglio pattern has a width of 1 μm to 100 μm.

3. The positive electrode for the lithium-sulfur secondary battery according to claim 1, wherein the intaglio pattern has a depth of 30 to 99% based on a thickness of the positive electrode active material layer.

4. The positive electrode for the lithium-sulfur secondary battery according to claim 1, wherein the intaglio pattern has a shape of a plurality of straight lines or dashed lines that are horizontal or perpendicular to each other.

5. The positive electrode for the lithium-sulfur secondary battery according to claim 1, wherein the intaglio pattern has a shape of a plurality of dots formed to be spaced apart from each other.

6. The positive electrode for the lithium-sulfur secondary battery according to claim 1, wherein the intaglio pattern is located within 200 μm based on a predetermined point located on the surface of the positive electrode active material layer.

7. The positive electrode for the lithium-sulfur secondary battery according to claim 1, wherein the positive electrode active material layer comprises 60 to 95 parts by weight of positive electrode active material based on 100 parts by weight of the positive electrode active material layer.

8. The positive electrode for the lithium-sulfur secondary battery according to claim 7, wherein the positive electrode active material comprises a sulfur-carbon composite, and the sulfur-carbon composite comprises 60 to 90 parts by weight of sulfur based on 100 parts by weight of the sulfur-carbon composite.

9. A method for manufacturing a positive electrode for a lithium-sulfur secondary battery, the positive electrode comprising a positive electrode active material layer with an intaglio pattern formed therein, the positive electrode active material layer having a porosity of 50 to 65%, the method comprising the steps of (1) forming the positive electrode active material layer by applying a slurry for forming a positive electrode active material on a current collector;

(2) rolling the positive electrode active material layer; and (3) forming a positive electrode active material layer with the intaglio pattern formed by irradiating a laser on the surface of the positive electrode active material layer after rolling, wherein the positive electrode active material layer after rolling has a porosity of 50 to 65%.

10. The method for manufacturing the positive electrode for the lithium-sulfur secondary battery according to claim 9, wherein the rolling in step (2) is performed through a roll-press process.

11. The method for manufacturing the positive electrode for the lithium-sulfur secondary battery according to claim 9, wherein a thickness of the positive electrode active material layer after rolling in step (2) is 80 to 99% relative to a thickness of the positive electrode active material layer before rolling in step (1).

12. The method for manufacturing the positive electrode for the lithium-sulfur secondary battery according to claim 9, wherein the laser in step (3) has a wavelength range of 300 nm to 2000 nm, and a frequency of 10 kHz to 1000 kHz.

13. The method for manufacturing the positive electrode for the lithium-sulfur secondary battery according to claim 9, wherein a loading loss rate of the positive electrode active material by step (3) is 5 to 20%.

14. A lithium-sulfur secondary battery comprising the positive electrode according to claim 1.

* * * * *